Apr. 3, 1923.
C. L. KEDDY
1,450,682
LOBSTER TRAP
Filed Oct 16, 1919
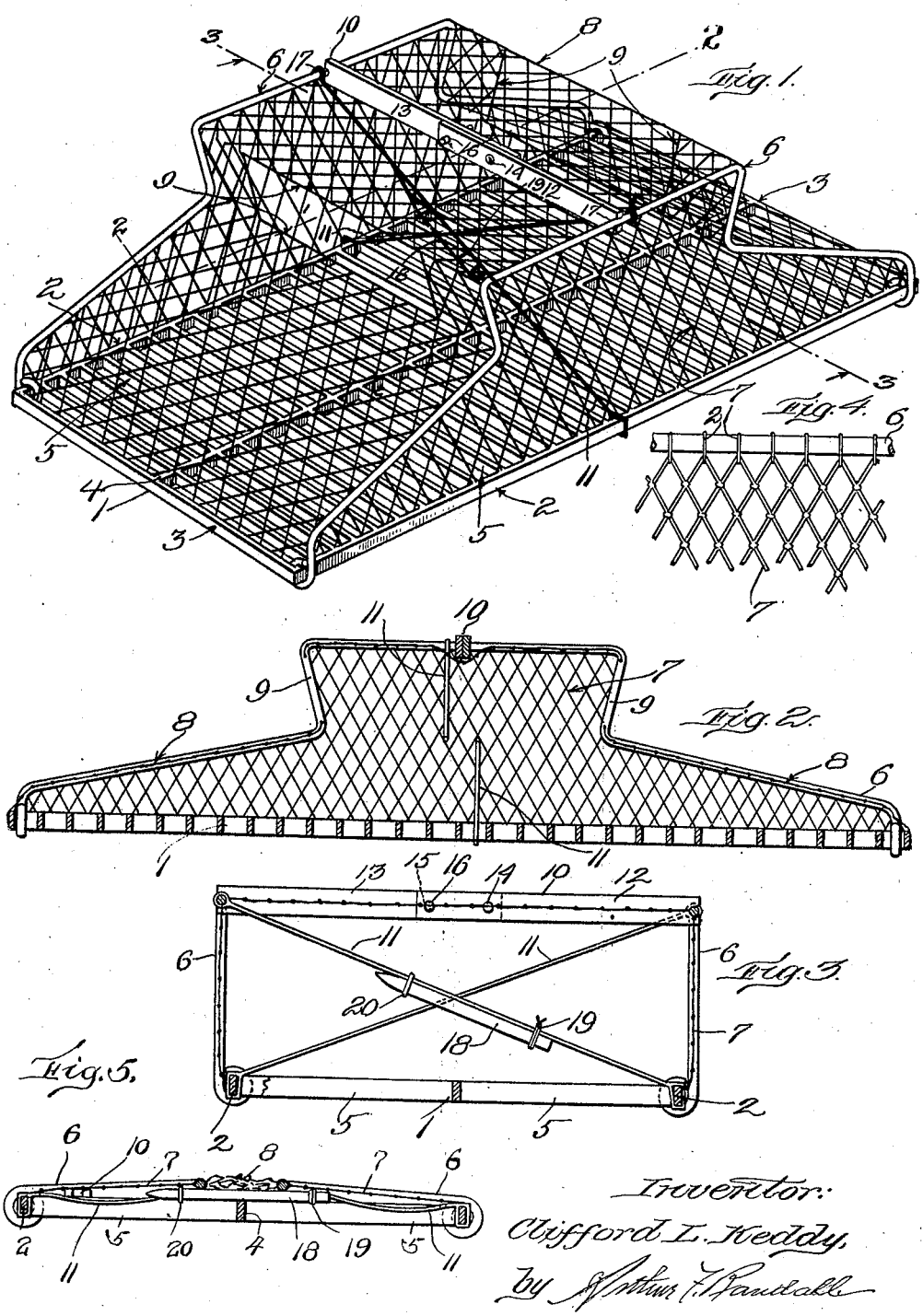
Inventor:
Clifford L. Keddy,
by Arthur F. Randall
Atty.

Patented Apr. 3, 1923.

1,450,682

UNITED STATES PATENT OFFICE.

CLIFFORD L. KEDDY, OF LYNN, MASSACHUSETTS, ASSIGNOR OF ONE-HALF TO WILLIAM A. FRYE, OF WELCHVILLE, MAINE.

LOBSTER TRAP.

Application filed October 16, 1919. Serial No. 331,209.

*To all whom it may concern:*

Be it known that I, CLIFFORD L. KEDDY, a subject of the King of Great Britain, residing at Lynn, in the county of Essex and State of Massachusetts, have invented certain new and useful Improvements in Lobster Traps, of which the following is a specification.

My invention relates to lobster traps and it has for its object to provide an improved device of this kind.

Lobster traps as heretofore commonly constructed have been made in the form of a more or less semi-cylindrical cage which was comparatively large, heavy and clumsy so that it was inconvenient to transport, handle, or store the same, particularly any considerable number thereof. That is, as lobster traps have heretofore been constructed a lobsterman attending to his traps and using a dory, as is usually the practice, could carry with him in his boat only a very few traps owing to the large amount of room occupied by each trap. Moreover, such traps have usually been made from wooden slats and were therefore heavy and difficult to handle, particularly after they had become watersoaked. The main object of my invention is to provide a light, inexpensive, and efficient lobster trap which can be "knocked down" or collapsed so that a greater number of traps can be carried in an ordinary dory than has heretofore been possible, and so that traps of this kind can be more conveniently stored and handled than has been the case with lobster traps as heretofore constructed. It is also the object of my invention to generally improve the construction of lobster traps so as to make them more efficient, lighter and stronger.

To these ends my invention consists of a lobster trap having the peculiar features of construction and mode of operation set forth in the following description and particularly pointed out and defined in the claims at the close thereof.

In the accompanying drawings:

Figure 1 is a perspective view of my improved lobster trap.

Figure 2 is a section on line 2—2 of Fig. 1. Figure 3 is a section on line 3—3 of Fig. 1.

Figure 4 is a section on line 4—4 of Fig. 3.

Figure 5 is a view like Fig. 3, showing the trap in its collapsed condition.

My improved lobster trap comprises a base frame 1 of rectangular form having four side bars 2, 2 and 3, 3 and a centrally disposed bar 4 from which latter a plurality of slats or bars 5 extend to the side bars 2, 2. This base frame or grid may be made from any suitable material but preferably is a light metal casting.

Pivotally connected with each side bar 2 near the ends of the latter is a side frame 6 consisting, preferably, of a metal bar bent into a bail-like shape and having its ends coiled loosely around the side bar 2 so that it can swing pivotally thereon. To each bail-shaped side frame 6 and the adjacent side bar 2 is fastened a side wall 7 of strong netting or the like while a top wall 8 of similar material is fastened at its edges to the side bars 1 and also to the bail-shaped frames 6. The top wall 8 is made with openings 9, 9 for the entrance and removal of the lobsters.

When the trap is in use its upright walls 6—7 are held in their extended positions shown in Fig. 1 by a brace 10 and two stay cords 11, 11. The brace 10 consists of two rigid bars 12 and 13, which may be made from wood, said bars being permanently pivotally connected by a bolt 14 and formed with registering holes 15 to receive a pin 16 by means of which the bars are locked in extended relation. The outer end of each bar 12 and 13 is made with a notch or socket 17 to receive the adjacent wall frame 6. Each tie cord 11 is fastened at one end to the upper portion of one of the wall frames 6 and at its other end to one of the side bars 2 of the base frame 1, said ties extending diagonally across the interior of the trap from one upper corner to the opposite lower corner thereby holding the walls against swinging outward beyond their perpendicular positions. When the brace 10 is in position it holds the walls against swinging inward.

One of the tie cords 11 has a bait holding spear or spike 18 fastened thereto by means of a cord or other suitable fastener 19. A loop 20 loosely surrounding the cord 11 and the pointed end of the spike 18 prevents the bait from being lost from the spike. This loop 20 can be slid lengthwise of cord 11.

When it is desired to collapse the trap the pin 16 is withdrawn from the brace 10 thus allowing the latter to be folded up on the pivot 14, after which the walls can be folded down onto the base frame 1, the brace 10 being placed within the structure. When in this collapsed condition the structure occupies very little space and a greater number of traps can be stored in a given space than has been possible with lobster traps as heretofore constructed. Moreover, the structure is light, strong and efficient as a trap, the metal frames being, of course, very durable and the walls 7 and 8 being easily replaced when worn out.

What I claim is:

1. A lobster trap comprising a base; two walls pivotally connected with opposite sides of said base; a top wall of open flexible material fastened at its edges to said base and to said pivotally connected walls; a removable brace for the upper portions of said pivotally connected walls, and flexible ties each secured at one end to the upper part of one of said pivotally connected walls and at its opposite end to said base at the opposite side of the structure.

2. A lobster trap comprising a base; two walls pivotally connected with opposite sides of said base; a top wall of netting fastened at its edges to said base and to said pivotally connected walls; a removable brace engaging the upper portions of said pivotally connected walls, and ties for holding said pivotally connected walls against said brace.

In testimony whereof I have affixed my signature.

CLIFFORD L. KEDDY.